A. A. DUNHAM.
EVAPORATING APPARATUS.
APPLICATION FILED OCT. 24, 1916.
1,236,825.
Patented Aug. 14, 1917.
FIG. 1.
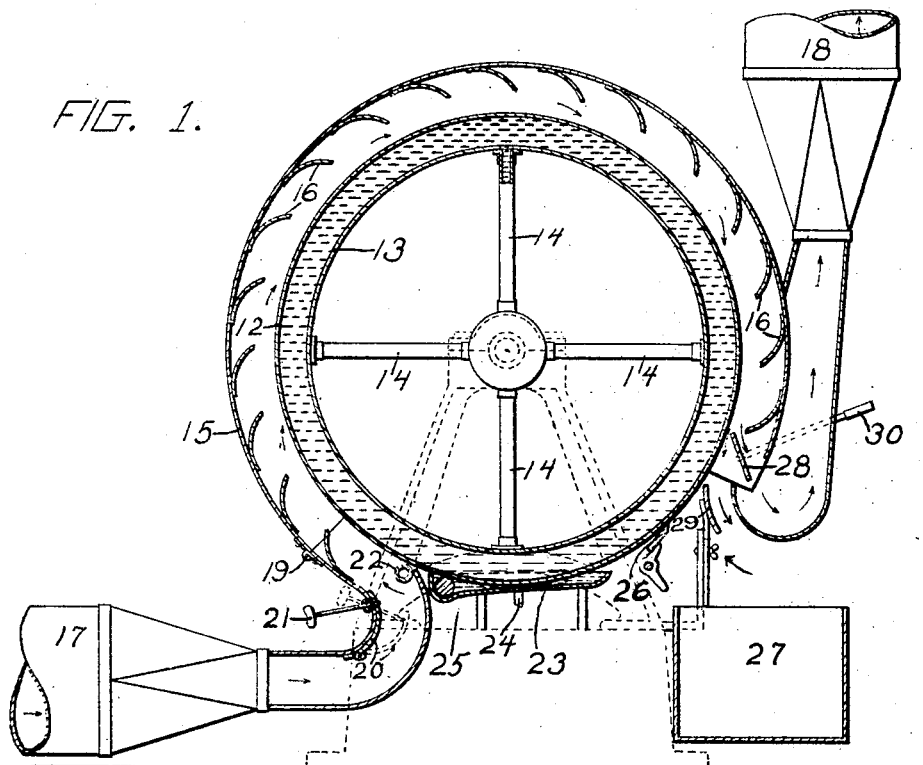
FIG. 3.
FIG. 2.
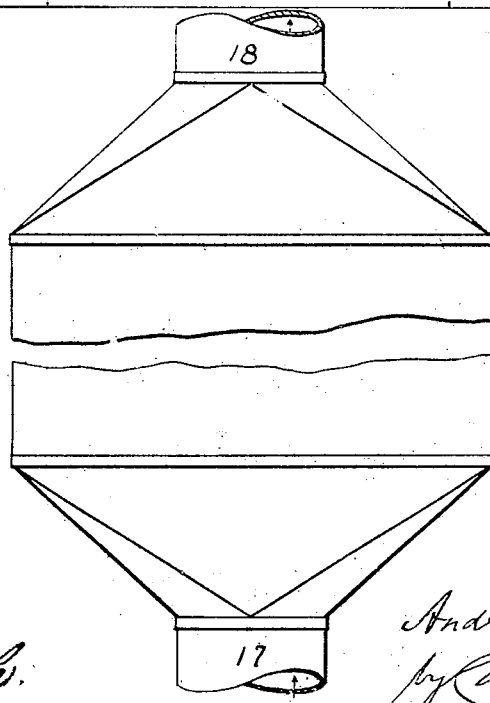
Inventor:
Andrew A. Dunham

UNITED STATES PATENT OFFICE.

ANDREW A. DUNHAM, OF BAINBRIDGE, NEW YORK, ASSIGNOR TO THE DRY MILK COMPANY, A CORPORATION OF NEW YORK.

EVAPORATING APPARATUS.

1,236,325.  Specification of Letters Patent.  Patented Aug. 14, 1917.

Application filed October 24, 1916. Serial No. 127,487.

*To all whom it may concern:*

Be it known that I, ANDREW A. DUNHAM, a citizen of the United States, residing at Bainbridge, in the county of Chenango and State of New York, have invented or discovered certain new and useful Improvements in Evaporating Apparatus, of which the following is a specification, reference being had therein to the accompanying drawing.

This invention relates to a machine or apparatus for evaporating liquids and is more especially intended for evaporating milk in making milk powder or desiccated milk in accordance with the process covered by U. S. Patent No. 1,074,418, dated September 30, 1913.

In the accompanying drawing Figure 1 is an end view, partly in vertical section, of a machine or apparatus embodying the present invention. Figs. 2 and 3 are views of the air inlet and discharge pipes.

Referring to the drawings, 12 denotes a cylinder mounted for rotation and which is intended to be heated internally, preferably by hot water. The cylinder 12 is preferably constructed with a jacket portion 13 connected with hollow journals of the cylinder, as by radial pipes 14, so that the hot water may be circulated through the said jacket portion of the cylinder, the heated liquid being entered at one hollow journal and discharged at the other, in a well-known manner. The rotating drying cylinder 12 is partly encircled by a hood 15 provided interiorly with deflecting wings 16 which are preferably curved, as shown, but which may be somewhat differently formed, if desired. A current of hot air entering at the pipe 17 is forced through the hood 15 and is discharged or exhausted through the exit pipe 18. The air inlet pipe 17 is preferably connected by a hinge 19 with the hood 15 so that it may be partly lifted when desired.

The throat of the pipe 17 is provided with a deflecting valve 20 by which the entering current of hot air may be regulated by varying the position of said valve by means of a regulating or screw device 21, the said valve diverting the air toward one side of the throat of the entering pipe and causing it to impinge against a deflector 22, which may be simply a piece of pipe. This deflector 22 forces the current of air to the opposite side of the entering pipe so that as it enters the hood 15 it will be diverted against the curved, inclined deflecting wings 16 the concave sides of which are opposed to the direction of movement of the passing air current so as to cause the air to pass through the chamber of the hood in a series of whirls which will bring all portions of the air into contact with the liquid on the surface of the drying cylinder 12 and thereby expedite the drying operation. It will be understood, of course, that the invention is not limited to the specific deflecting means shown, as the details of construction of the deflecting means at the throat of the air inlet pipe may be varied widely, within the province of mechanical skill, without departing from this feature of the invention.

The liquid to be dried is contained in a pan or receptacle 23 located beneath the cylinder 12 which dips into said pan or receptacle, and to which latter the liquid is supplied through a pipe 24. The pan or receptacle 23 is preferably constructed with an inclined bottom in the lower portion or pocket of which is arranged a doctor roll 25 and by means of which doctor roll the liquid to be evaporated is evenly distributed on the surface of the cylinder. Owing to this particular construction of the pan or receptacle 23 the liquid may be all, or nearly all, taken up from said pan or receptacle by the doctor roll, when the liquid is so low that the cylinder does not reach it, so that when the machine is stopped there need be but little liquid remaining in the said pan or receptacle.

In the operation of machines of this kind the liquid is evaporated into a thin crust or film during less than a complete rotation of the cylinder, and this crust or film of material is removed from the drying cylinder by means of a scraper 26 and is discharged into a receptacle 27, as is usual in the operation of machines of this kind. The evaporated material when discharged, however, is not entirely dried but is still slightly moist, and for the purpose of drying out this slightly moist material the present improved machine is provided at or near the discharge end of the hood 15 with a valve 28 which may be opened more or less for the passage of a small portion of the hot air current to the deflector 29, the hot air discharged at the valve 28 being so regulated that as it leaves the deflector 29 an air current will be formed by suction that will tend to lift or float the film being discharged into the receptacle 27, thereby bringing it into contact with the current of hot air coming from the deflector, and thus hastening the final drying thereof. The deflector will be so arranged or adjusted as to secure the most advantageous lifting or floating of the dried film to effect this final drying. The position of the valve 28 may be changed, by means of a handle 30, to regulate the amount of hot air which may pass from the hood 15 to the material which is being removed from the drying cylinder.

It will be understood that the hood 15 extends the whole length of the drying cylinder and that the connections of the entering and discharging pipes 17 and 18 with said hood will be flaring so as to be of proper form to admit and discharge the heated air to and from the chamber of said hood, as will be understood from Figs. 2 and 3. In practice the air discharged from the pipe 18 will preferably be returned to the heating chamber from which the air entering at the pipe 17 is supplied.

Having thus described my invention I claim and desire to secure by Letters Patent:—

1. In an evaporating apparatus, the combination with a rotating drying cylinder, of a hood partly surrounding said cylinder and provided internally with a series of curved deflecting wings, and means for supplying hot air to and discharging it from said cylinder, said curved wings being arranged so that their concave sides are opposed to the direction of movement of the passing air current.

2. In an evaporating apparatus, the combination with a rotating drying cylinder and a hood partly surrounding said cylinder and provided internally with curved deflecting wings, of air inlet and discharge pipes communicating with the chamber of said hood, the throat of the said inlet pipe being provided with means for diverting the incoming air current against said wings which are arranged so that their concave sides are opposed to the direction of movement of the passing air current.

3. In an evaporating apparatus, the combination with a rotating drying cylinder and a hood partly surrounding said cylinder, of air inlet and discharge pipes communicating with the chamber of said hood, said inlet pipe having a hinged connection with said hood.

4. In an evaporating apparatus, the combination with a rotating drying cylinder and a hood partly surrounding said cylinder, of air inlet and discharge pipes communicating with the chamber of said hood, a scraper, located outside of said hood, for removing dried material from said cylinder, and a deflecting valve located between the discharge end of said hood and said scraper, and by means of which a portion of the heated air current passing through the chamber of said hood may be diverted so as to act, as hereinbefore described, on the material being removed from the said cylinder by said scraper.

5. In an evaporating apparatus, the combination with a rotating drying cylinder and a hood partly surrounding said cylinder, of air inlet and discharge pipes communicating with the chamber of said hood, a scraper for removing dried material from said cylinder, a deflecting valve located between the discharge end of said hood and said scraper, and by means of which a portion of the heated air current passing through the chamber of said hood may be diverted so as to act, as hereinbefore described, on the material being removed from the said cylinder by said scraper, and a valve, at or near the discharge end of said hood, for regulating the passage of air to said deflecting valve.

6. In an evaporating apparatus, the combination with a rotating drying cylinder, of a pan or receptacle located beneath said cylinder and into which said cylinder extends, said pan or receptacle having an inclined bottom with a pocket at its lowest part, and a doctor roll located at said pocket and serving to distribute the material, to be evaporated, on said cylinder evenly, and to take up liquid from said pocket and apply it to said cylinder when the liquid in said pan or receptacle is so low as not to be reached by said cylinder.

In testimony whereof I affix my signature.

ANDREW A. DUNHAM.